United States Patent [19]

Daudi

[11] Patent Number: 4,736,611
[45] Date of Patent: Apr. 12, 1988

[54] APPARATUS FOR WHEEL MANUFACTURE FOR CORRECTING ROTATIONAL NON-UNIFORMITY OF A PNEUMATIC TIRE AND WHEEL ASSEMBLY

[75] Inventor: Anwar R. Daudi, E. Lansing, Mich.

[73] Assignee: Motor Wheel Corporation, Lansing, Mich.

[21] Appl. No.: 846,365

[22] Filed: Mar. 31, 1986

Related U.S. Application Data

[63] Continuation-in-part of Ser. No. 667,338, Nov. 1, 1984, abandoned.

[51] Int. Cl.[4] .................. B21D 53/26; B21D 28/30
[52] U.S. Cl. ............................ 72/327; 72/333;
29/159.01; 83/192; 83/465; 83/862; 83/926 R
[58] Field of Search ............... 72/326, 327, 333, 332,
72/294, 312, 402, 452; 29/159.01, 159 R,
159.03; 83/926 R, 862, 863, 192–194, 465

[56] References Cited

U.S. PATENT DOCUMENTS

| | | | |
|---|---|---|---|
| 1,995,488 | 3/1935 | Tormyn et al. | 72/402 |
| 2,188,477 | 1/1940 | Le Jeune | 29/159.01 |
| 3,131,972 | 5/1964 | Walton et al. | |
| 3,580,043 | 5/1971 | Gollwitzer | 72/402 |
| 3,581,550 | 6/1971 | Waterbury | 72/402 |
| 3,688,373 | 9/1972 | Gregg | 29/159 R |
| 3,855,837 | 12/1974 | Philipp | 29/159.01 |
| 4,279,287 | 7/1981 | Daudi et al. | 29/159.01 |
| 4,354,407 | 10/1982 | Daudi et al. | 29/159 R |

FOREIGN PATENT DOCUMENTS 333056 8/1930 United Kingdom .

Primary Examiner—Daniel C. Crane
Attorney, Agent, or Firm—Barnes, Kisselle, Raisch, Choate, Whittemore & Hulbert

[57] ABSTRACT

A method and apparatus for forming bolt and center-pilot mounting openings in vehicle wheels, particularly styled-disc vehicle wheels. A preformed rim and disc assembly is engaged and fixtured around the rim bead seat with the inboard disc face resting on a lower die assembly and without plastic deformation to the rim or disc. An upper die assembly having an array of bolt hole punches is moved into piercing-and-coining engagement with the disc to form the bolt openings continued motion of the upper die assembly against the wheel disc pushes the disc and lower die assembly into shearing engagement with a center punch which forms the center-pilot opening. The axes of the bolt openings and/or center pilot opening and/or bead seats may be aligned or offset from each other.

7 Claims, 8 Drawing Sheets

U.S. Patent  Apr. 12, 1988  Sheet 1 of 8  4,736,611
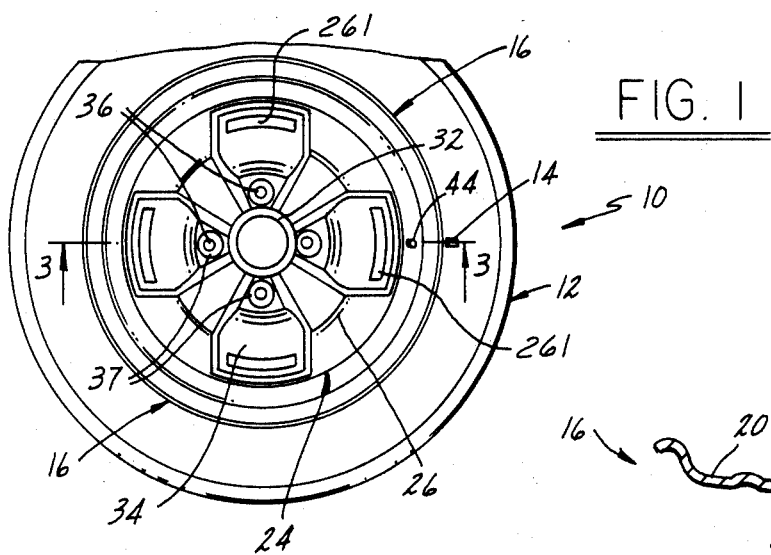
FIG. 1
FIG. 3
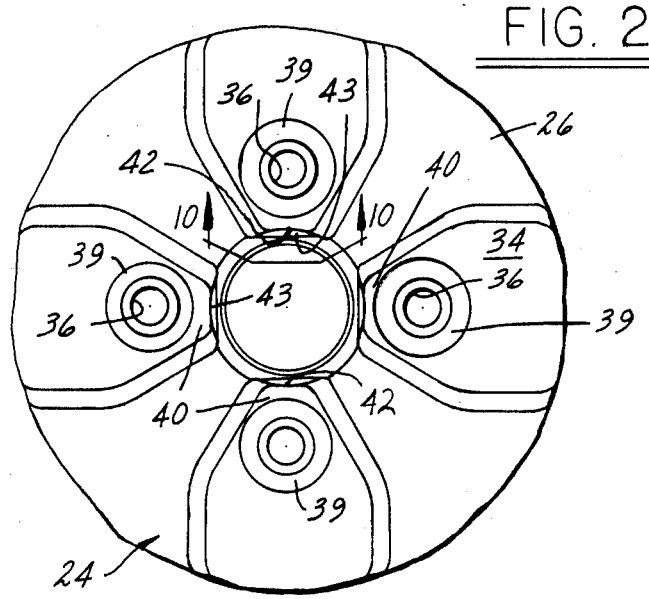
FIG. 2
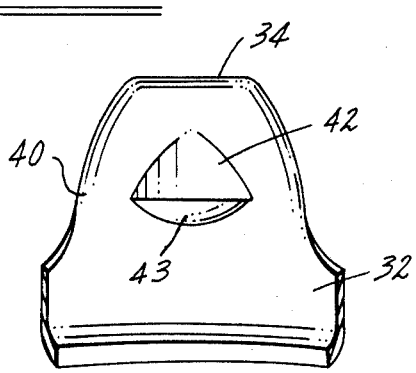
FIG. 10
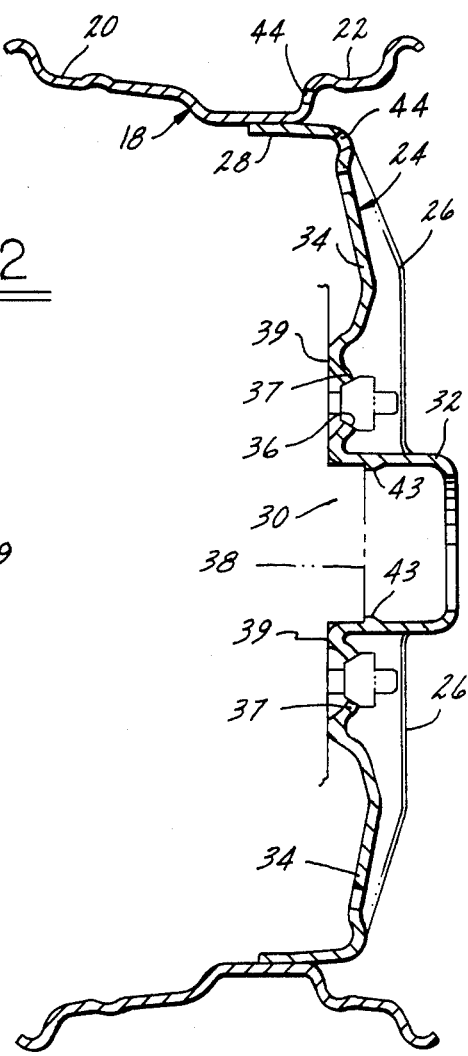

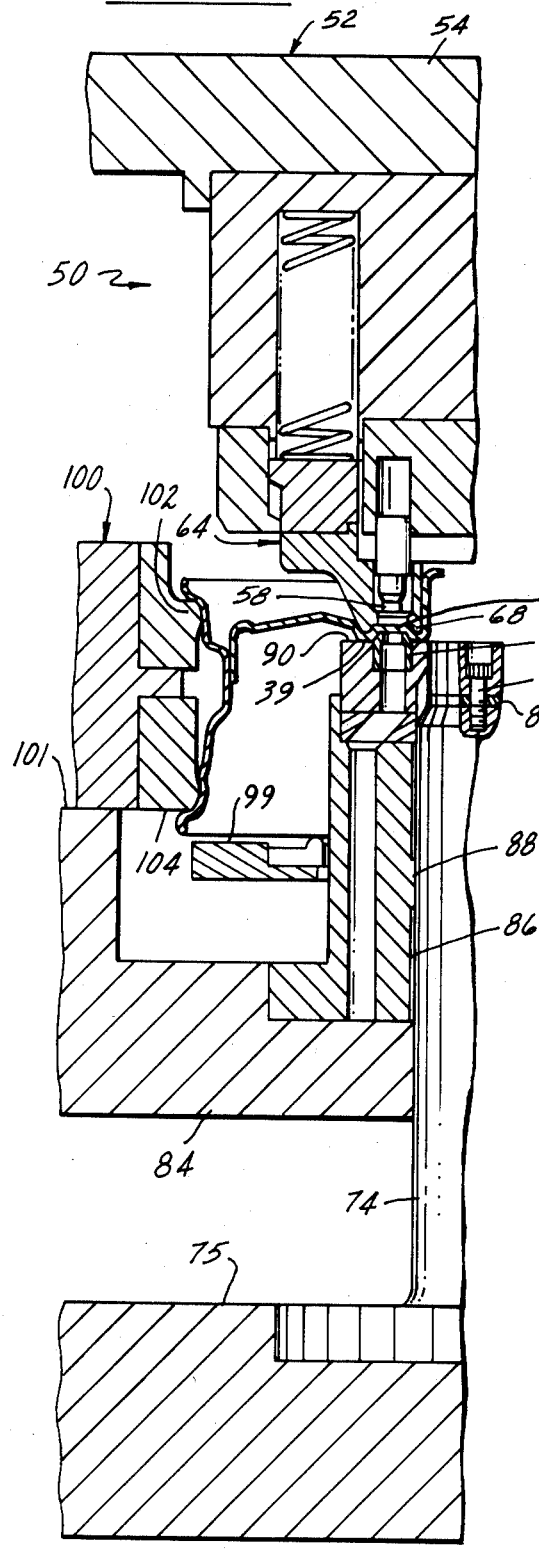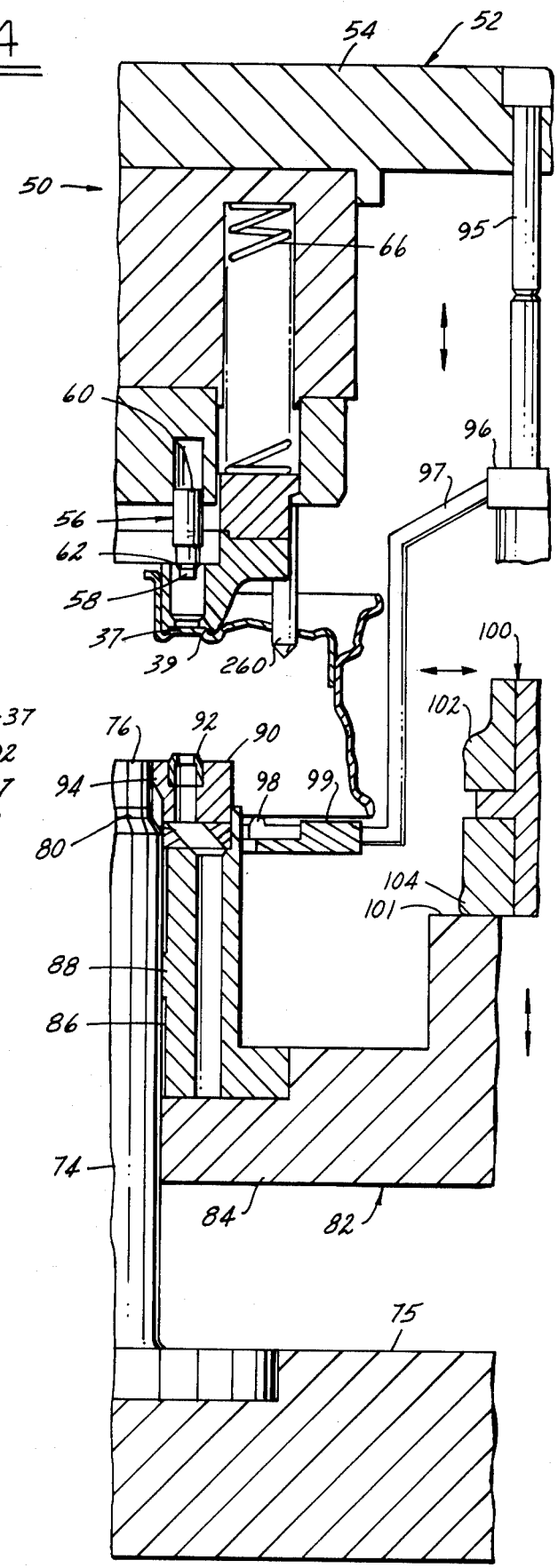
FIG. 4
FIG. 5

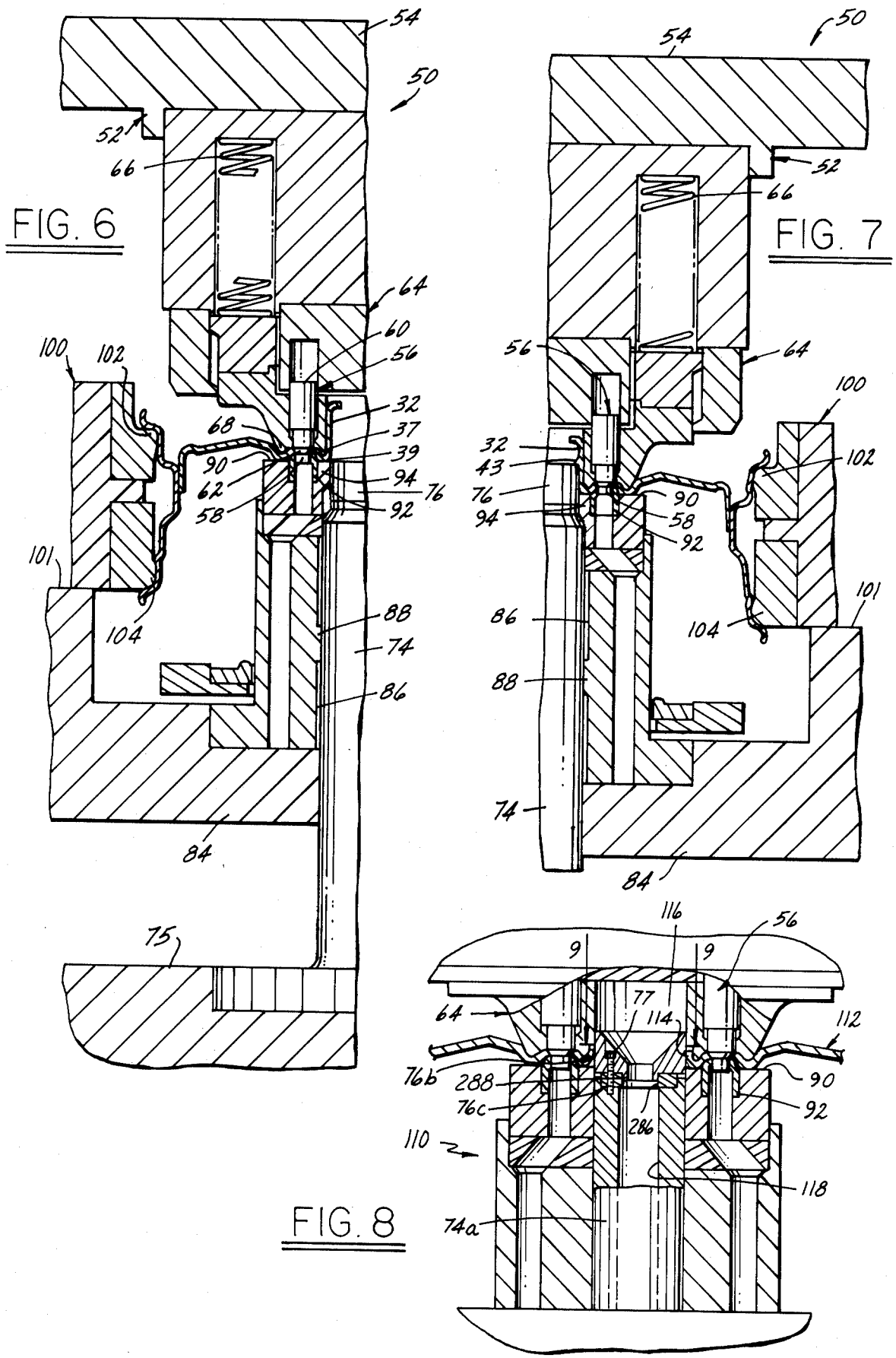

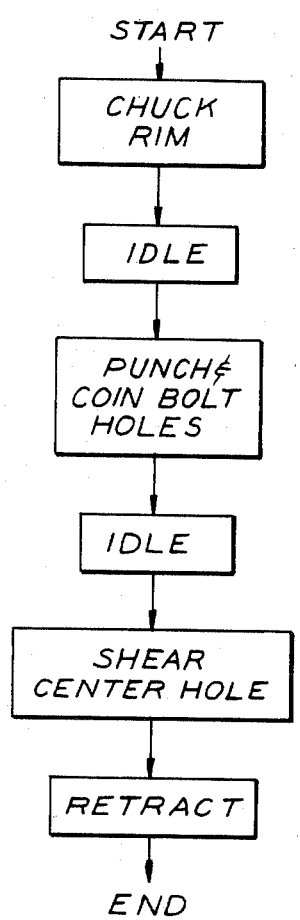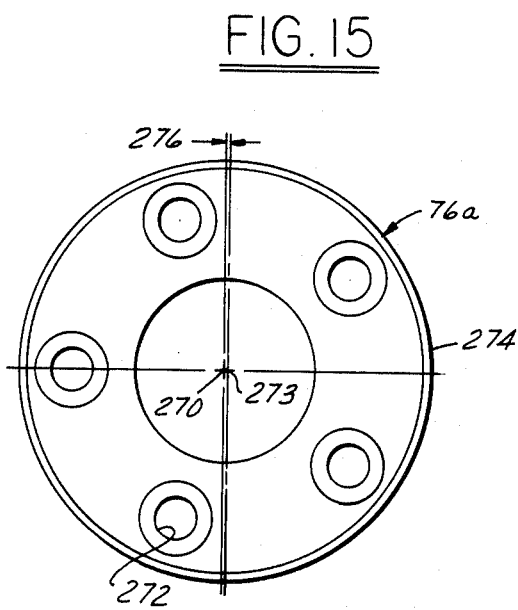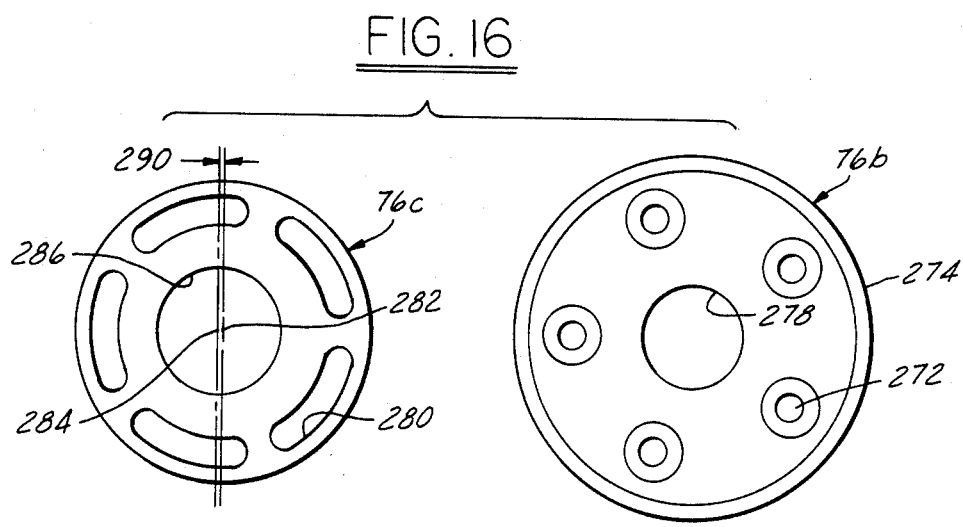

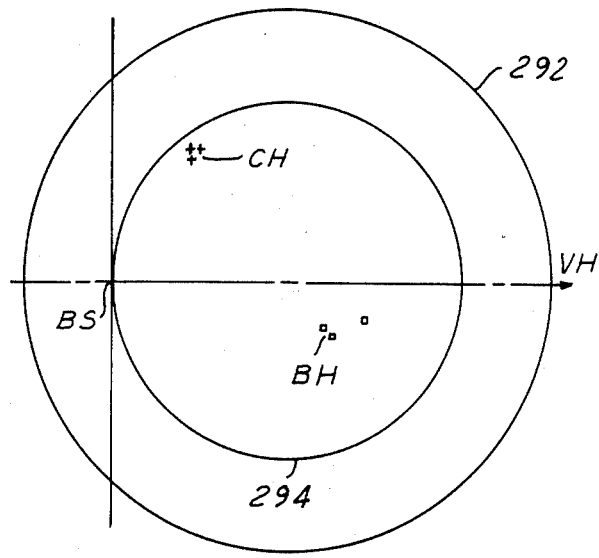
FIG.17A
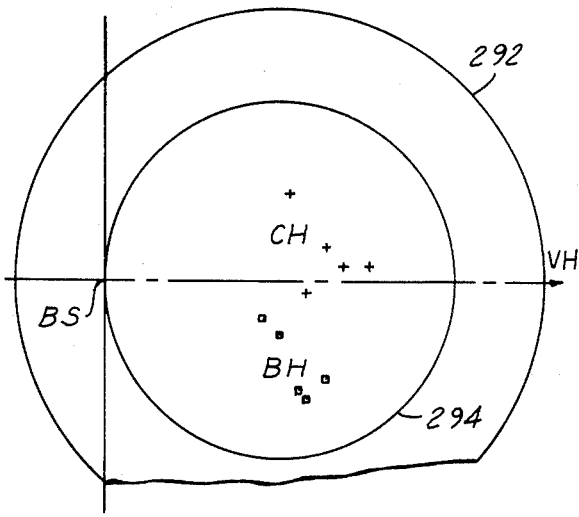
FIG.17B
FIG.19
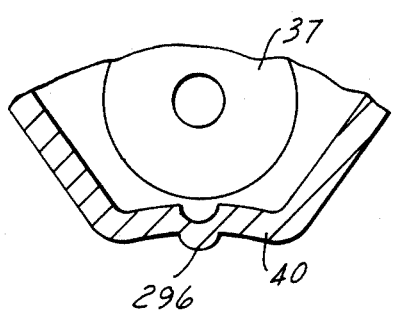
FIG.18
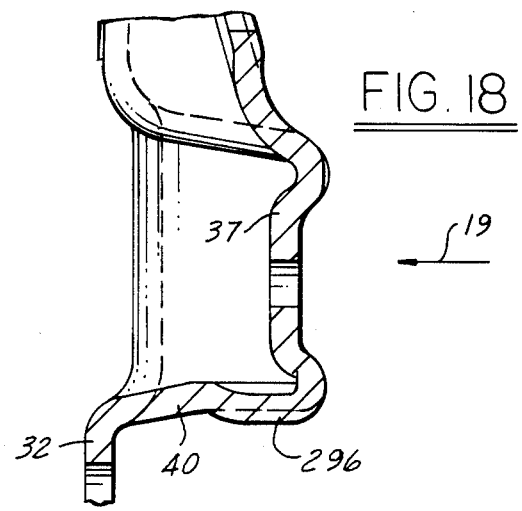
FIG.20
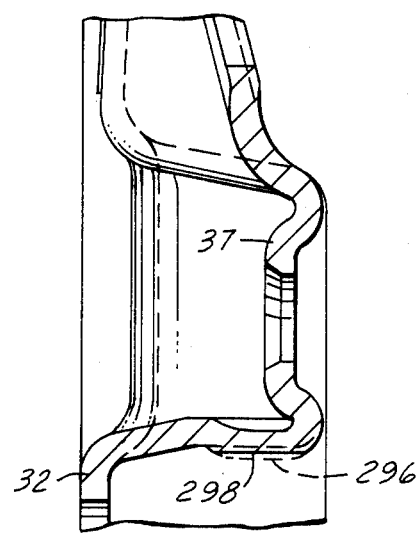

APPARATUS FOR WHEEL MANUFACTURE FOR CORRECTING ROTATIONAL NON-UNIFORMITY OF A PNEUMATIC TIRE AND WHEEL ASSEMBLY

This application is a continuation-in-part of application Ser. No. 667,338 filed Nov. 1, 1984, now abandoned.

The present invention relates to the art of vehicle wheel manufacture, and more particularly to correction of variations in the radial runout and/or radial force variations in a pneumatic tire and wheel assembly.

BACKGROUND OF THE INVENTION

A problem long-standing in the art lies in the production of pneumatic tires and wheels which, when assembled and operated on a vehicle, run true about their axis of rotation. Forces generated by any circumferential variations in the tire carcass and/or out-of-round condition in the tire or wheel cause vibraions, which in turn lead to dissatisfied customers and significant warranty claims against automobile manufacturers. The present trend among manufacturers toward higher tire inflation pressures and smaller vehicles to improve fuel economy accentuates this problem, so that uniformity of radial runout and force vibrations of the tire and wheel assembly has become more critical than in the past.

Vehicle wheels conventionally include a circular array of disc bolt openings adapted to receive mounting studs for mounting the wheel to a vehicle, and a center-pilot opening adapted to be received over the wheel hub. It has been and remains conventional practice in the industry to attempt to form the bolt mounting circle and center-pilot openings co-axially with each other and with the tire rim bead seat, with the goal thus being a perfect true-running wheel. A number of techniques have been proposed for accomplishing this result, including formation of the bolt and center openings with a single tool while locating off of the bead seat, machining the center opening while locating off of the preformed bolt-mounting openings, and/or circumferentially permanently deforming the rim bead seats while locating off of the bolt-mounting and/or center-pilot openings.

Gregg U.S. Pat. No. 3,688,373 discloses apparatus for rounding and forming vehicle wheels. A disc and rim assembly having preformed bolt and center openings is fixtured in a die by pins received into the bolt openings. With the bolt-hole circle so located, rim-rounding dies are reciprocated against the rim bead seats, which are initially oversize, to plastically deform the bead seats with respect to the fixtured bolt-hole circle. With the wheel so deformed and clamped, additional sizing may be performed on the bolt holes by supplemental punches, and the center opening may be deformed by bringing the clamped rim and disc against a center-hole forming tool.

The machine and process disclosed in the Gregg patent suffer from a number of deficiencies in both theory and practice. First of all, it is not possible to locate the bead seat axis, and/or to control radial runout from the average bead seat axis, employing a rim-deformation process of the character disclosed to accuracy currently specified by industry standards. Secondly, elasticity in the rim and disc preclude accurate location of either the bolt or center opening axis with respect to the average bead seat axis, let alone accurate location of both opening axes with respect to the average bead seat axis and with respect to each other. Thirdly, it is extremely difficult in the forming apparatus disclosed in Gregg to vary the location of the bead seat, bolt-hole and center-opening axes with respect to each other.

A particular problem is encountered in connection with so-called styled wheels which possess a deep-drawn neck or cone integrally projecting from the disc surrounding the center-pilot opening to simulate a styled hub cap. It is conventional practice in manufacture of such wheels to machine the inside surface or ID at the base of the styled neck or cone while locating off of the bead seats to obtain concentricity between the center opening and bead seats. Such a separate machining operation is expensive to implement and tends to weaken the disc structure at the base of the styled center cone.

Daudi et al U.S. Pat. Nos. 4,279,287 and 4,354,407, both assigned to the assignee hereof, depart from the conventional practice of attempting to form a true-running wheel, and address the problem of radial runout and/or radial force variations in a pneumatic tire and wheel assembly by intentionally forming the bolt-mounting and/or center-pilot openings in the wheel disc at the time of wheel manufacture on an axis which is eccentrically offset from the average axis of the bead seats on the wheel rim. This offset is in a direction and amount which is predetermined to locate the low point or high point of the first harmonic of beat seat radial runout circumferentially adjacent to a selected location on the wheel rim. In the preferred embodiments, the low point of the first harmonic of bead seat radial runout lies substantially within a quadrant centered about the valve hole in the rim. A pre-tested tire having the location of the high point of the first harmonic of radial force variation marked thereon may then be assembled onto the wheel such that the respective tire and wheel harmonics are complementary and thereby tend to cancel each other.

In the preferred wheel forming apparatus disclosed in the above-noted Daudi et al U.S. patents, the bolt and center-pilot openings are formed by separate punches fixedly mounted on a single punch assembly which simultaneously punch-forms all of the openings in a wheel disc while the wheel is located by fixturing the same about the rim bead seats. Although the method and apparatus disclosed in the reference patents, as well as the wheels formed thereby, have enjoyed substantial success and acceptance in the art, a problem lies in the fact that the relationship of the bolt hole circle and center-pilot opening with respect to each other is fixed at the time of die manufacture and cannot be readily adjusted thereafter. Another problem is encountered in connection with application of this technology to manufacture of styled wheels wherein the center-pilot surface at the base of the styled disc cone cannot be readily formed while the bolt hole openings are formed.

OBJECTS AND SUMMARY OF THE INVENTION

It is therefore an object of the present invention to provide a method of manufacturing a vehicle wheel of the described type wherein the center-pilot and bolt-mounting openings are accurately and adjustably positioned with respect to each other and with respect to the average axis of the rim bead seats, as well as to provide an apparatus for performing such method and a wheel resulting from application thereof.

A further and yet more specific object of the invention is to provide an economical and accurate method of locating the axis of the center-pilot openings and/or the rim bead seats, and to provide an apparatus for performing such method as well as a wheel resulting from implementation thereof.

A further object of the invention is to provide a wheel manufacturing method and apparatus which is economical to implement in mass production of vehicle wheels.

It is yet another object of the invention to provide a method and apparatus of the described character wherein the location of the center of the bolt-hole circle, the axis of the center-pilot opening, and the average axis of the rim bead seats are all adjustable with respect to each other, so that the method and apparatus of the invention may be implemented in manufacture of true-running wheels wherein all axes and centers are nominally concentric, or in the manufacture of wheels in accordance with the above-referenced patents wherein the low point or high point of the first harmonic of average bead seat radial runout is eccentrically offset with respect to either or both of the bolt or center-pilot openings in the wheel disc by an amount and in a direction predetermined to locate the low point or high point of the first harmonic of bead seat radial runout circumferentially adjacent to a selected location on the wheel rim.

In summary, the foregoing and other objects of the invention are accomplished by forming the bolt and center-pilot openings at separate stages of a continuous machine motion against the disc of a preassembled rim and disc while the rim is fixtured and located, but not deformed, around the bead seats. The wheel forming apparatus in accordance with the preferred embodiment of the invention includes a planar circumferential array of jaws mounted for radial reciprocation into engagement with the rim bead seats to fixture and hold a preassembled rim and disc, and thereby define an average bead seat axis. Preferably, the jaws engage the bead seats around less than fifty percent of the rim circumference. It is critical that no plastic deformation results from this fixturing process, both because of the aforementioned problem of accurately locating the various axes simultaneously with such plastic deformation, and because plastic deformation around less than the entire periphery would scar the bead seats and create unacceptable rim undulations. Portions of the forming apparatus which engage the disc during the rim-fixturing process are designed to accommodate limited lateral motion of the rim and disc assembly, so that the average bead seat axis is controlled by the rim-engaging jaws without stressing or deforming the disc.

An upper die assembly is mounted above the planar jaw array and includes punches for piercing and coining the bolt-mounting openings in a wheel fixtured by the jaws. A lower die assembly is mounted beneath the jaw array to engage and hold the wheel disc as the bolt openings are pierced. The lower die assembly and the circumferential jaw array are carried for conjoint downward motion about a fixed center column under pressure from continued downward motion of the upper die assembly against the wheel disc. A swage punch is mounted on the upper end of the fixed center column to engage and form the center-pilot opening as the disc is carried downwardly thereagainst by the die assemblies.

The axis of the center column and the conjoint axis of reciprocation of the upper and lower die assemblies (nominally) define the axis of the bolt-hole circle formed in the wheel disc. The jaws which locate the average bead seat axis are individually adjustable with respect to the die axis, so that the average bead seat axis and bolt hole axis may be aligned, or may be laterally offset as taught by the above-referenced Daudi et al patents. Likewise, the axis of the punch on the center column is laterally selectable with respect to the column/die axis to accommodate coaxial positioning of the center-pilot opening with the average bead seat axis, and/or alignment with the bolt-opening axis, and/or eccentric offsetting from both. Preferred embodiments of the preformed rim and disc assembly include radial deformation or ledges around the disc center opening which are sheared by the swage punch. Deformation of the disc body and consequent misplacement of the center hole axis is thereby minimized. One embodiment of the shear punch includes a stripper for removing sheared material.

Operation of the invention thus in general contemplates fixturing of a preformed disc and rim so as to locate the average bead seat axis. A first or upper die assembly having bolt-opening punches mounted thereon is brought into engagement with the disc while a second or lower die assembly engages the opposing disc face to support the same as the bolt openings are formed. Continued downward motion of the upper die assembly after forming the bolt openings pushes the lower die, bead seat locators and wheel downwardly against a fixed punch which engages the wheel disc and forms the center-pilot opening. Time lags, incorporated as lost motion in the forming apparatus, permit the wheel to settle into position between successive fixturing and forming operations.

BRIEF DESCRIPTION OF THE DRAWINGS

The invention, together with additional objects, features and advantages thereof, will be best understood from the following detailed description, the appended claims and the accompanying drawings in which:

FIG. 1 is a fragmentary outboard elevational view of a vehicle tire and wheel assembly which includes a styled vehicle wheel manufactured in accordance with the present invention;

FIG. 2 is a fragmentary inboard elevational view on an enlarged sale of the bolt and center-pilot opening region in the wheel of FIG. 1;

FIG. 3 is a sectional view of the wheel of FIG. 1 taken substantially along the line 3—3 of FIG. 1;

FIGS. 4—7 are fragmentary sectioned elevational views of apparatus for forming the bolt and center-pilot openings in the wheel of FIGS. 1—3 at respective successive states of operation;

FIG. 8 is a fragmentary sectioned elevational view of a modified apparatus in accordance with the invention for forming bolt and center-pilot openings in an alternative wheel configuration;

FIG. 10 is a fragmentary sectional view taken substantially along the line 10—10 in FIG. 2;

FIG. 14 is a flow chart illustrating operation of the apparatus of FIGS. 11–12;

FIG. 15 is a plan view of a center hole punch which may be employed in the apparatus of FIGS. 4–7;

FIG. 16 is a plan view of the center punch and eccentric shim arrangement shown in FIG. 8;

FIGS. 17A and 17B are graphs which illustrate results obtained in locating center-hole and bolt-hole axes with respect to each other and with respect to average bead seat axis in accordance with the invention;

FIG. 18 is a fragmentary sectional view on an enlarged scale showing the bolt and center-opening region in a modified preformed wheel rim and disc assembly prior to center and bolt-hole formation;

FIG. 19 is a fragmentary view taken from the direction 19 in FIG. 18; and

FIG. 20 is a view similar to that of FIG. 18 showing the wheel after center and bolt hole-formation.

DETAILED DESCRIPTION OF THE PREFERRED EMBODIMENTS

Figure 9:
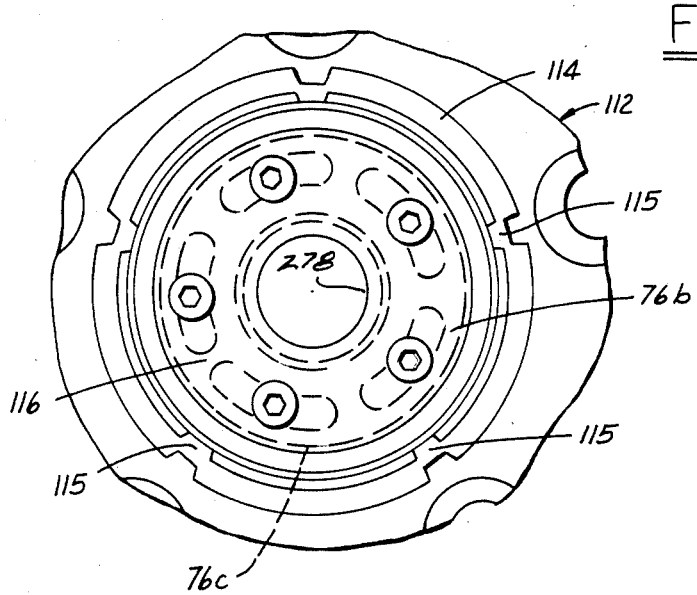
FIG. 9 is a fragmentary sectional view taken substantially along the line 9—9 in FIG. 8.

FIG. 1 illustrates a pneumatic tire and wheel assembly 10 as comprising a pneumatic tire 12 pretested for variations in radial force under dynamic operating conditions and having the circumferential location of a peak of the first harmonic of radial force variation marked at 14 on the tire sidewall. Tire 12 is mounted on a wheel 16. Referring collectively to FIGS. 1–3 and 10, wheel 16 includes a wheel rim 18 having inboard and outboard bead seat regions 20, 22 for receiving respective inboard and outboard bead toes of tire 12 in the usual manner. Bead seat regions 20, 22 define an average bead seat axis which may be located using conventional test techniques.

A wheel mounting disc 24 is affixed to and internally spans rim 18 for mounting wheel 16 and assembly 10 on a vehicle. In the ornamental vehicle wheel illustrated in the drawings, disc 24 includes a circumferential series of radially directed axially raised spoke-simulating portions 26 which extend from the disc peripheral flange 28 radially inwardly to a hubcap-simulating cone 32 which surrounds the disc center opening 30. Raised spoke-simulating disc portions 26 are circumferentially separated from each other by the radially directed axially inwardly depressed disc portions 34, which likewise extend from flange 28 to cone 32. Bolt openings 36 are formed in a circular array, one within each of the depressed disc portions 34 adjacent to cone 32 in a corresponding, slightly raised, bolt hole island 37. Bolt openings 36 are circularly arrayed on a bolt-circle axis. Each of the depressed disc portions 34 terminates in a radially inwardly directed shoulder 40 (FIGS. 2 and 10) which collectively define the center-pilot opening which is received over and pilots wheel 16 on a spindle hub 38, as illustrated in phantom in FIG. 3. Hubcap-simulating cone 32 projects integrally axially outboard from shoulders 40 surrounding center opening 30.

In accordance with the present invention, an arcuate radially inwardly directed land 42 is formed on each shoulder 40, with the several lands 42 being on a common imaginary cylinder of revolution which defines the effective axis of center opening 30. Lands 42 are preferably formed following assembly of wheel 16 so as to place the axis of center-pilot opening 30 at a predefined relationship with respect to the average axis of bead seat regions 20, 22 and/or the axis of the circle of bolt openings 36. Such pilot axis may be nominally concentric or coaxial with the average bead seat axis and/or the bolt-hole circle axis, or may be radially offset from either or both of such axes in accordance with the teachings of the Daudi et al patents noted hereinabove. Where one or both of the center-pilot and bolt-opening axes are intentionally eccentrically offset from the average bead seat axis, it is preferred to locate a peak of the first harmonic of radial runout adjacent to the wheel valve opening 44 (FIGS. 1 and 3). Tire indicia 14 is then located in assembly in radially adjacent alignment with the valve hole 44 so that the intentionally-created first harmonic of wheel radial runout tends to cancel the first harmonic of radial force variation of the tire.

FIGS. 4–7 illustrate apparatus 50 for forming bolt and center-pilot mounting openings in the wheel of FIGS. 1–3 and 10. Apparatus 50 includes an upper die assembly 52 having a base 54 coupled to a hydraulic or mechanical drive (not shown) for driving upper die assembly 52 in a vertical reciprocating motion. A plurality of bolt-opening punches 56 are affixed to base 54 in a downwardly dependently oriented circular array concentric with the axis of vertical reciprocation. Each punch 56 includes a substantially cylindrical tip 58 for piercing a bolt opening in a wheel disc, a base 60 affixed to the die base, and an intermediate conical shoulder 62 which engages the disc subsequent to piercing of the bolt openings by tip 58 and coins the outboard edge of the pieced bolt openings. A die head or stripper 64 is mounted for lost-motion axial movement on base 54 at the lower face thereof surrounding punches 56. A plurality of coil springs 66 normally bias head 64 downwardly of base 54 to the position shown in FIG. 4 of the drawings. The lowermost portion of head 64 is contoured as at 68 to engage the wheel disc surrounding the raised bolt-hole islands 37, and is apertured to receiver wheel disc cone 32 and permit passage of bolt hole punches 56 therethrough.

A cylindrical column 74 is mounted to a fixed lower base 75 and projects upwardly therefrom coaxially with the vertical axis of reciprocation of upper die assembly 52. A swage punch 76 is mounted by bolts 77 on the upper end of column 74. The diameter of swage punch 76 is less than the diameter of column 74, with the upper end of column 74 having a flat upper surface 80 perpendicular to the axis of die reciprocation onto which punch 76 is mounted. A lower die assembly 82 is mounted for guided axial sliding motion on and with respect to fixed center column 74. Lower die assembly 82 includes a lower die base 84 having a center bore 86 received over column 74 and radially inwardly oriented shoulders 88 in sliding engagement therewith. Die assembly 82 has a planar upper surface 90 perpendicular to the axis of die reciprocation and adapted to receive a wheel disc on the mounting surface thereof defined by a depressed circular shoulder 39 surrounding each raised bolt hole island 37. In the initial position of lower die assembly 82 illustrated in FIG. 4, disc mounting surface 90 is co-planar with the upper surface of punch 76.

A circumferential array of buttons 92 is mounted on lower die assembly 82 and these buttons project upwardly from surface 90 so as to be individually received from the inboard direction within the pockets defined by wheel disc islands 37. A shoulder 94 slidably engages punch 76. A plate 99 surrounds die assembly 82 and carries a pair of parallel rails 98 on opposed sides of column 74. Plate 99 is suspended by an array of arms 97 (FIGS. 4 and 12) from hydraulic springs 96 (FIGS. 4 and 11) which normally has rails 98 above the upper surface of punch 76. Die base 54 carries and array of pins 95 which urge springs 96 downwardly, and thus reciprocate plate 99 and rails 98 with respect to die assembly 82.

A circumferential array of jaws 100 are slidably mounted for conjoint radial reciprocation on a planar surface 101 of lower die assembly base 84 perpendicular to column 74. Each jaw 100 includes a pair of horns 102, 104 contoured for engagement from the outward radial direction with the outboard and inboard bead seats of the preassembled rim and disc. Most preferably, the wheel-engaging positions of the several jaws 100 are individually adjustable. Jaws 100 are each carried by a support 200 (FIGS. 11 and 12) slidably received in a radial bearing 202 on die base 84. Bearing 202 thus forms a guideway for motion of support 200 and jaw 100 radially of column 74. A shaft 204 is affixed by the pin 206 (FIG. 11) to support 200 and projects radially therefrom slidably through a spring block 208 affixed to the upper surface of die base 84. A coil spring 210 is captured in compression between block 208 and the jam nuts 212 threaded onto the radially outer end of shaft 204 for normally biasing support 200 radially outwardly with respect to column 74. A pair of cam rollers 214 are rotatable on shafts 216 within a slot 218 adjacent to the upper radially outer edge of support 200. All jaws 100 and jaw supports 200 are identical.

Upper die assembly 52 is coupled to a controlled mechanical or hydraulic ram 220 (FIG. 11) for reciprocal motion in the axial direction. A circumferentially continuous actuator ring 222 (FIGS. 11 and 12) is axially slidably carried by a circumferential array of keepers 224 which are affixed to and project upwardly from die base 84, and is biased upwardly with respect to die base 84 by an array of coil springs 226. Keepers 224 each have an enlarged annular head 228 which cooperates with a counterboard opening 230 in ring 232 for limiting upward motion of ring 222 with respect to base 84. Each spring 226 is captured in compression between a spring cap 232 affixed to ring 222 by the bolts 234, and a spring locator pin 236 threaded onto base 84 and projecting upwardly therefrom into the spring coils. Orthogonally spaced fingers 240 integrally project outwardly from the body of ring 222 and slidably embrace corner guide post 242 for guiding motion of ring 222. Die base 84 is likewise slidably guided by corner posts 242. Corner posts 242 are affixed to and project upwardly from base 75.

A plurality of circumferentially spaced actuator blocks 244 have shanks 246 slidably carried by and projecting inwardly from ring 222 in respective alignment with rollers 214 on the several jaw supports 200. Each block 244 has a pair of angulated or ramped lower inside surfaces 248 for engaging a corresponding roller 214 and urging the associated support 200 and jaw 100 radially inwardly during initial downward motion of ring 222, and radially facing surfaces 250 for permitting additional downward motion of ring 222 without corresponding radial motion of jaws 100 either inwardly or outwardly. A screw 252 extends through a block 254 affixed to ring 222 and is threadably received into shank 246 of actuator block 244 for adjusting radial position of each activator block 244 with respect to ring 222, and thereby adjusting the radially inward position of the associated jaw 100 with respect to the remaining jaws and with respect to the axis of column 74. An abutment 256 is affixed to and depends from upper die base 54 for engagement with ring 222. Pneumatic (nitrogen-filled) springs 257 bias die base 84 upwardly with respect to fixed base 75 and stops 255. Abutment columns 258 are carried by base 84 for downward-driving engagement with abutment 256.

In operation, a disc wheel is preformed so as to include rim 18 having inboard and outboard bead seat regions 20, 22, and a wheel mounting disc 24 carried interiorly of the wheel rim. The rim and disc illustrated in the drawings are preferably separately formed to the contours shown in any suitable blanking, bending, rolling and/or forming operation, and are joined to each other as by welding or the like where the outer periphery 28 of wheel disc 24 engages the inner surface of rim 18. Apparatus 50 receives such a preformed rim and disc manually or in an automated operation for the purpose of forming the bolt and center-pilot mounting openings therein. Preferably, in the embodiment shown in FIGS. 11 and 12, with the upper die assembly fully retracted, a preformed wheel is slidably conveyed on its inboard rim edge along rails 300 onto rails 98. Upper die assembly 52 is then moved downwardly (from a position not shown) through the position of FIG. 4 toward the position of FIG. 5. In FIG. 4 pins 95 have engaged springs 96 and have begun to urge plate 99 and rails 98, and the wheel carrier thereof downwardly toward lower die assembly 82. However, and in accordance with an important feature of the present invention, stripper 64 does not contact the wheel at this point so that the wheel is free to slide on rails 98. Continuous downward motion of upper die assembly 52 moves the inboard disc face against lower die assembly surface 90, and then engages ring 222 (FIGS. 11 and 12) to close jaws 100 to engage or chuck the rim bead seats (FIG. 14).

The preformed rim and disc is thus positioned on lower die assembly surface 90 with buttons 92 received within the pockets of bolt hole islands 37. Preferably, as shown in greater detail in FIG. 13, head 64 and buttons 92 are contoured with respect to disc islands 37 so that there is adequate space or clearance to accommodate positioning of the disc and rim assembly over the desired tolerance range when jaws 100 close and engage the rim bead seats. Jaws 100 are thus in the positions illustrated in FIGS. 5-7 wherein the horns 102, 104 engage and hold rim seats 22,20. The several jaws 100 are preadjusted employing screws 252 (FIG. 11) during a set-up operation so that the average bead seat axis defined by the engaged bead seat regions has a predetermined relationship to the axis of die reciprocation, either nominally coaxial or eccentrically offset therefrom by a predetermined amount and polar direction. The axis of the circle of bolt holes to be formed by punches 56 is preferably co-incident with the axis of die reciprocation. Thus, the several jaws 100 locate the average bead seat axis coaxially with the bolt hole circle axis, or place such average bead seat axis at a position eccentrically offset from the axis of the bolt-hole circle by a preselected amount and direction in accordance with the teachings of the above-referenced Daudi et al patents. With the wheel so fixtured by the locating jaws 100 (FIG. 5), downward propulsion of upper die assembly 52 is continued in an uninterrupted motion to and through the positions illustrated in successive FIGS. 6–7.

As upper die assembly 52 is propelled downwardly from the position of FIG. 5 toward the position of FIG. 6, the annular bosses 68 on upper die head or stripper 64 engage the wheel disc around the several bolt hole islands 37, and thus cooperate with buttons 92 on lower die assembly 82 to clamp the bolt hole islands against deflection and to hold the wheel disc firmly against lower die mounting surface 90. With upper die head 64 thus engaged with the wheel mounting disc (FIG. 5), continued downward motion of upper die assembly 52 results in lost-motion of die base 54 over die head 64 against the force of springs 66. Punches 56 are thus propelled through apertures in die head 64 so that the punch tips 58 engage and pierce circular bolt openings in the fixtured wheel disc. Further downward motion of upper die assembly 52 brings punch conical shoulders 62 into engagement with the outboard rim of the pierced bolt holes so as to coin each of the pierced bolt holes. The several bolt opening punches 56 are positioned on base 54 so that engagement of abutment 256 against columns 258 corresponds to completion of the coining operation on the pierced bolt openings.

Figure 11:
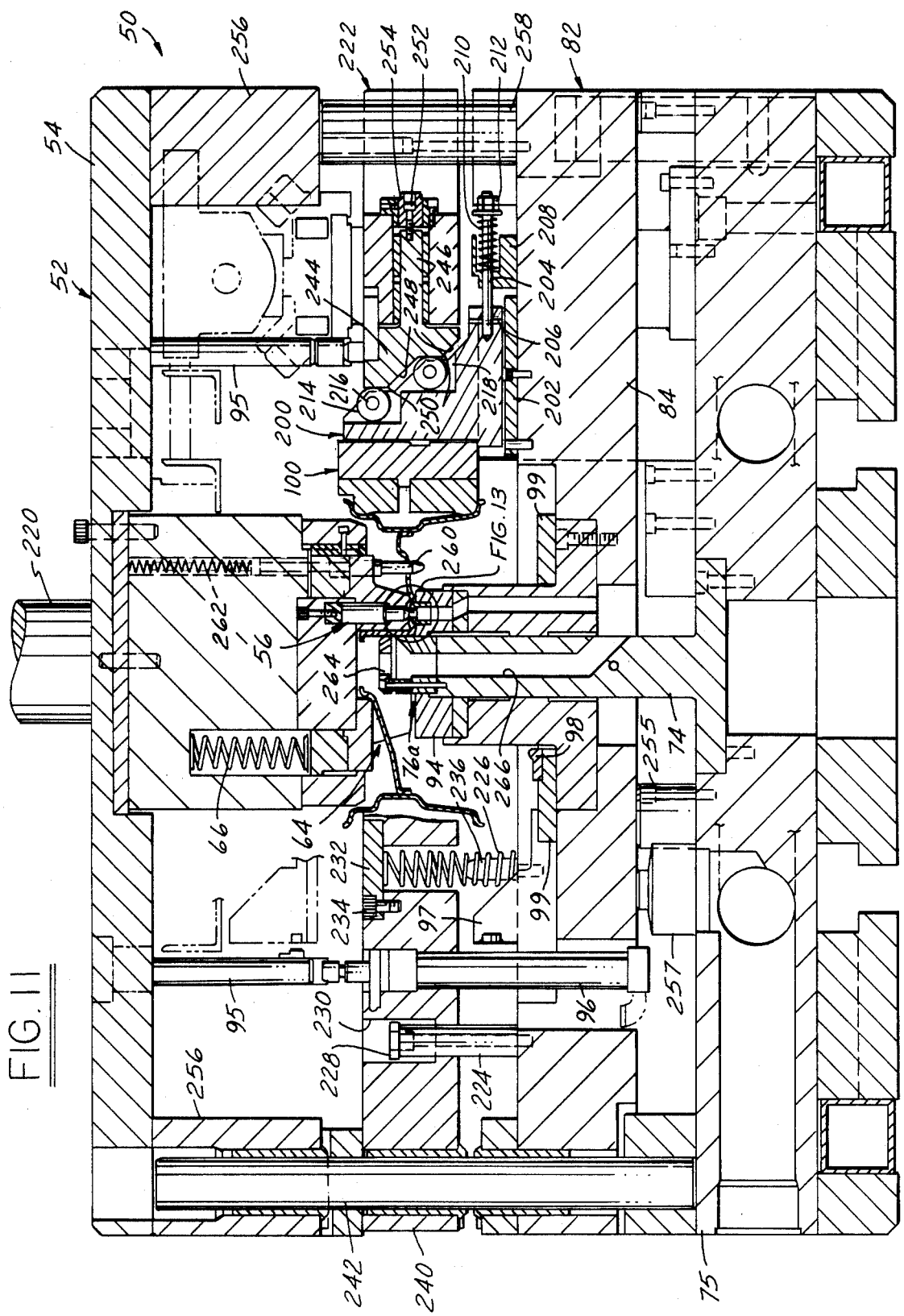
FIG. 11 is a sectioned elevational view bisecting modified apparatus for forming wheel mounting openings in accordance with the invention.

Continued downward motion of upper die assembly 52 from the position of FIG. 6, wherein piercing and coining of the bolt openings is completed, toward the position of FIG. 7 is transmitted to lower die assembly 82 through columns 258. Lower die assembly 82 and locating jaws 100 mounted thereon thus move downwardly with respect to center column 74 against the force of springs 257 until base 84 abuts stops 255 (FIG. 11). During such downward motion, disc shoulders 40 are drawn downwardly against and over the upper outside edge of punch 76. The diameter of the punch edge is greater than the preformed inside diameter of the disc shoulders, and in fact corresponds to the diameter of the wheel mounting hub (38 in FIG. 3) over which the wheel is to be mounted in use on a vehicle. Thus, punch 76 shears material from the disc shoulder to form lands 42, with excess material being "plowed" to form ledges 43. The inside diameter of the interrupted circle of four lands 42 so sheared is accurately positioned and dimensioned for operation as a center-pilot opening. Shear punch 76 is designed either to located the axis of such land circle inside diameter nominally coincident with the axis of column 74 and thus with the bolt hole circle, and/or coincident with the average bead seat axis, and/or eccentrically offset from one or both by a predetermined amount and direction. This may be accomplished by making punch 76 eccentric, such as punch 76a in FIG. 15, or by making the punch concentric and mounting the same on a shim eccentrically adjustable on column 74 to achieve differing positions of the center-opening axis, such as punch 76b and shim 76c in FIGS. 8-9 and 16. From the position of FIG. 7, upper die assembly 54 is withdrawn vertically upwardly, with lower die assembly 82 returning to the rest position of FIGS. 4-6. Jaws 100 are retracted and ring 99 lifts the wheel. The wheel may then be withdrawn from the forming apparatus.

FIGS. 8 and 9 illustrate a modified apparatus 110 in accordance with the invention for forming the bolt and center-pilot mounting openings in a so-called draw-neck-center wheel 112. In wheel 112 illustrated in FIGS. 8 and 9, the flange 114 which surrounds and defines the preformed center opening is terminated at about the level of the outboard surface of the bolt hole islands, and does not project outwardly therefrom to form a hub cone as in the styled wheel previously discussed. As best seen in FIG. 9, flange 114 is substantially circular, with radially inward depressions 115 being positioned between each bolt opening island and the wheel axis. The structure and principles of operation of the apparatus 110 are similar to those previously discussed in detail in connection with FIGS. 4–7, and need not be repeated. One important feature of the apparatus 110 illustrated in FIG. 8, which was not embodied in the apparatus of FIGS. 4–7, contemplates a scrap drop-out chute comprising a central bore 116 in swage punch 76b, which flares outwardly to the uppermost surface of the punch. Bore 116 is aligned in assembly with a central bore 118 in column 74a. Thus, in the embodiment of FIGS. 8 and 9, the material which is sheared from the inside diameter of the center opening flange depressions 115 will fall by gravity through chute openings 116,118 for disposal.

Figure 12:
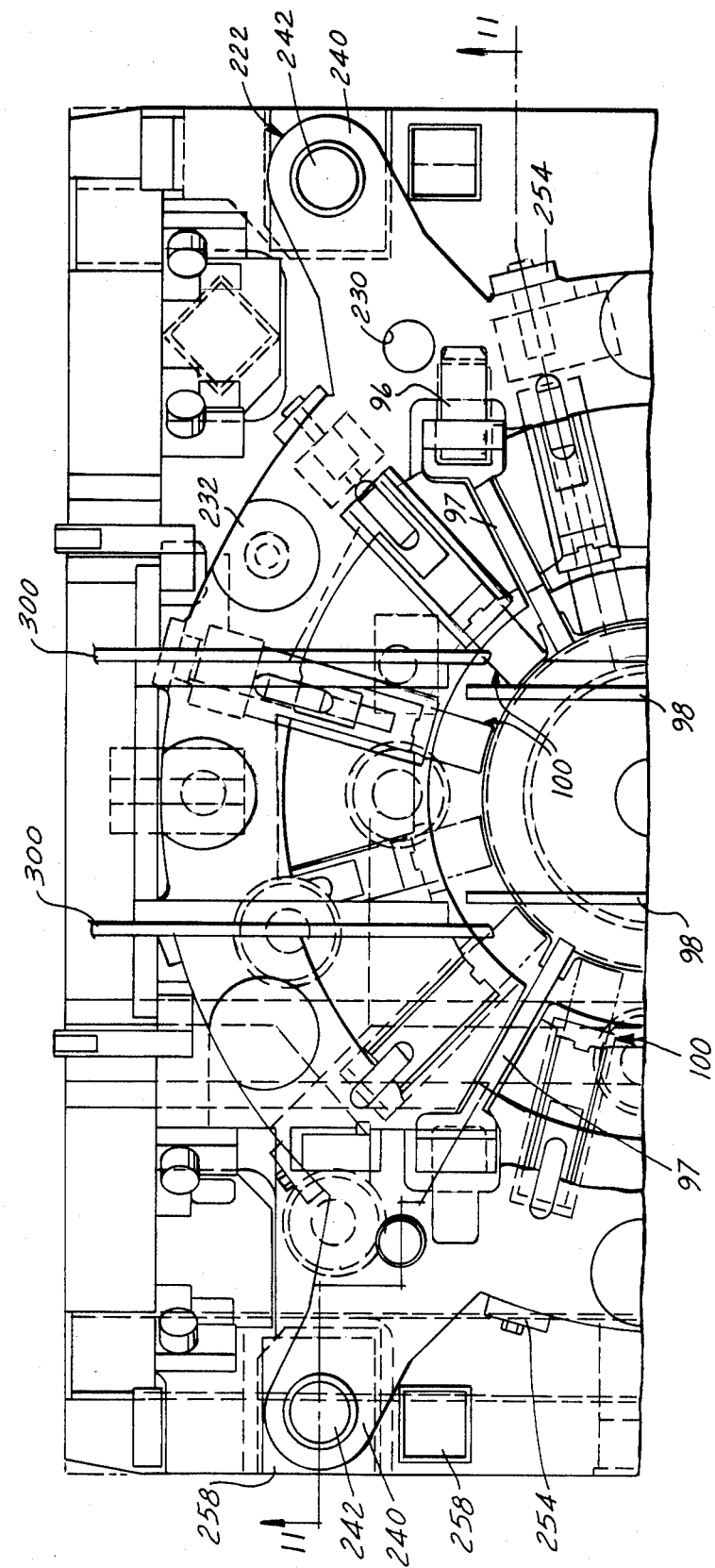
FIG. 12 is a fragmentary plan view of the apparatus of FIG. 11 with the upper die assembly withdrawn.

FIGS. 11-12, in addition to illustrating the overall die arrangement for the apparatus hereinabove discussed, also illustrate modified punching means for an embodiment of the styled wheel having five bolt holes, as distinguished from the four-hole embodiment of FIGS. 1-3. Elements of the apparatus of FIGS. 11—12 which correspond to those hereinabove discussed in detail possess identical reference numerals. Die head 64 in the embodiment of FIGS. 11-12 includes a circumferential array of pin pairs 260 biased downwardly with respect to die base 54 by the springs 262 for reception into the disc openings 261 and engagement with angulated edges of spaced openings 261 (FIG. 1) in the preassembled rim and disc, and thereby locating and holding the disc preform circumferentially with respect to the forming apparatus. Swage punch 76a has an annular stripper ring 264 affixed thereto axially upwardly of the swaging edge of punch 76a, stripper ring 264 having an outside diameter which is slightly less than that of the swaging punch edge. The purpose of stripper 264 is to remove ledges 43 (FIG. 10) sheared from the disc ID as the rim and disc assembly is withdrawn upwardly from punch 76a, and to direct such material downwardly through the center openings 266 in swage punch 76a and column 74.

Figure 13:
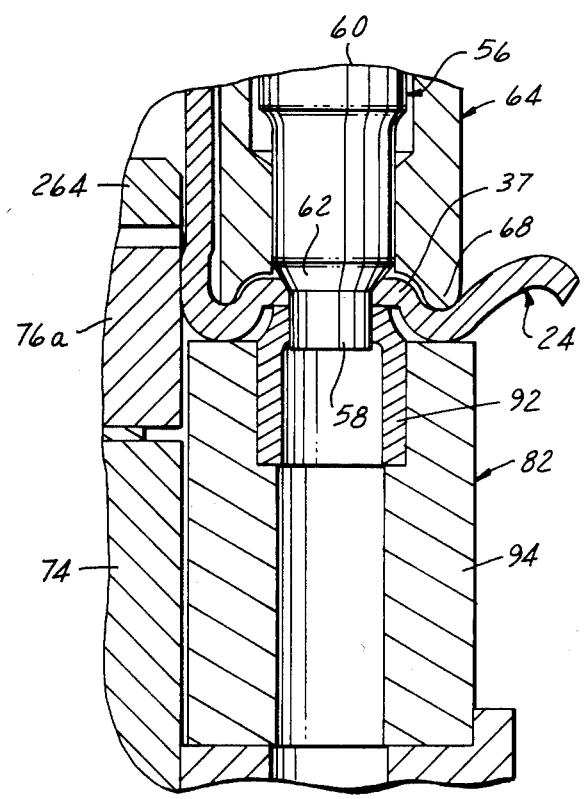
FIG. 13 is a fragmentary view on an enlarged scale of that portion of FIG. 11 contained within the circle "FIG. 13"

FIG. 13 is an enlarged view which illustrates the apparatus of FIGS. 11-12 in the fully closed position (corresponding to FIG. 7). The contour 68 of die head 64 is such as to produce line contact with disc 24 surrounding bolt hole island 37, leaving radial clearance both inwardly and outwardly. In the same way, buttons 92 on lower die assembly 82 axially engage the inboard surface of bolt hole islands 37, but are dimensioned radially for clearance with respect to the disc material. In addition, the zones of disc 24 thus contacted by die head 64 and buttons 92 have at least a limited planar surface extending perpendicular to the disc axis. Thus, in accordance with an important feature of the invention, the disc-engaging surfaces of the upper and lower die assembly accommodate limited radial bodily motion of the rim and disc assembly, i.e., lateral shifting or sliding of the preform in the die set, upon closure of jaws 100 for accurate location of the average bead seat axis under control of jaws 100 without stressing the rim or disc.

FIG. 14, which is a flow diagram illustrating the sequence of operations on the rim and disc assembly, illustrates another important feature of the present invention. That is, between each operation on the rim and disc assembly—i.e. chucking or fixturing the rim by closure of jaws 100 (FIG. 5), punching and coining the bolt holes (FIG. 6 or 11), and shearing the center hole (FIG. 7 or 13)—there is a limited idle period. This idle time, which is on the order of tenths of seconds, permits the rim and disc assembly to settle prior to the next operation. Inclusion of the idle times as illustrated in FIG. 14 has been found to be very beneficial in terms of accurately locating the various wheel axes as hereinabove described. Most preferably, the idle periods are built into the forming apparatus as lost motion in a continuous movement of the upper die assembly with respect to the lower die assembly.

FIG. 15 is a plan view of swage punch 76a in FIG. 11. It will be noted in particular that the axis or centerline 270 of the swage mounting openings 272 is laterally eccentric or offset from the axis 273 of swaging edge 274 by the predetermined amount 276. Thus, with swage punch 76a mounted on column 74 and a rim and disc assembly propelled downwardly thereagainst, the axis of the center hole will correspond to axis 273 of edge 274 and be eccentrically offset from axis 270 of punch 76a and column 74 by the amount 276. At the same time, the average bead seat axis is offset a predetermined amount from the axis of column 74 by adjustment of jaws 100, so that total eccentricity of the center hole with respect to the average bead seat axis is determined by these two offsets. Most preferably, a number of punches 76a are provided having differing predetermined eccentricities 276 for selective assembly to column 74 as desired. Of course, at least one punch 76a in the set of punches should possess zero eccentricity 276—i.e. have axes 270,273 coincident—so that the disc center-hole axis will coincide with the axis of column 74 and the center of the disc bolt-hole circle.

FIG. 16 illustrates swage punch 76b of FIGS. 8 and 9. In swage punch 76b, the axis of mounting openings 272 and swage edge 274 are coincident with the axis of center opening 278. However, a shim 76c, which is mounted between punch 76b and column 74, has a circumferential array of arcuate mounting slots 280 on a common circle having a center 282 which is offset from or eccentric to the axis 284 of the shim center opening 286. Swage punch 76b has a depending center boss 288 (FIG. 8) which is slidably received with a precision fit in shim center opening 286. Thus, amount and angle of eccentricity of swaging edge 274 of punch 76b is adjustable with respect to the axis of column 74 by loosening the swage punch mounting bolts 77 (FIG. 8) and adjusting shim 76c angularly of the column axis, openings 272 in punch 76b being sufficiently oversize to permit limited lateral motion of punch 76b with respect to bolts 77 (FIG. 8) and column 74a. It will be noted that shim 76c rests in a counterbore on the upper surface of column 74b to prevent radial motion, and that boss 288 (FIG. 8) has a close fit with center opening 286 of shim 76c. These close fits hold radial precision, bolts 77 serving merely to clamp punch 76b and shim 76c from the axial direction.

FIGS. 17A and 17B illustrate operation of apparatus in accordance with the present invention for selectively and adjustably positioning the bolt-hole and center-hole axes with respect to average bead seat axes. Each of the FIGS. 17A and 17B are polar diagrams which illustrate magnitude of eccentricity of center-hole axes CH and bolt-hole axes BH with respect to average bead seat axis BS for a number of test wheels. FIGS. 17A and 17B also illustrate the angle of such eccentricities with respect to a line from the average bead seat axis BS to the disc valve hole VH. Each of the FIGS. 17A and 17B indicate location of center-hole axes and bolt-hole axes for a number of test wheels with respect to a first tolerance limit 292, which corresponds to an industry standard wheel specification 5.1.8 set by General Motors Corporation, and a second tighter tolerance standard 294 set by applicant's assignee. In FIG. 17A, both the center-hole axes CH and the bolt-hole axes BH are clustered within the tolerance specification 294. The axis of the disc center opening may be varied by adjusting angular orientation of shim 76c (FIGS. 8 and 16), or by selecting an appropriate swage punch 76a (FIGS. 11 and 15), so as to move the center-hole axes closer to the bolt-hole axes. Thus, the bolt hole axes, which are nominally concentric with the axis of column 74, are not adjusted, and the average bead seat axes BS which is determined by adjusted location of jaws 100 with respect to column 74 are not varied. Rather, the center-hole axes are positioned more closely to the axis of column 74, and thus more closely to the bolt-hole axes. The results are illustrated in FIG. 17B wherein both the center-hole axes CH and the bolt-hole axes BH are within specification 294 with respect to the average bead seat axis BS and angular orientation of valve hole VH, and are also closer to each other.

FIGS. 18–20 illustrate a modification to the styled wheel of FIGS. 1–3 for enhancing accuracy of center hole location. More particularly, an indentation or ledge 296 is struck radially inwardly on each shoulder 40 of disc hub cone 32. As the wheel disc is propelled downwardly over the swage punch, the punch shears material from indentations 296 to form shoulders 298 (FIG. 20) on a common cylinder of revolution which defines the center hole axis. By deforming indentations 296 rather than the body of shoulders 40 as in the embodiment of FIGS. 1–3 and 10, elastic deformation of the shoulder during the swaging process, and consequent mispositioning of the disc center hole axis, is significantly reduced. The draw-neck wheel illustrated in FIGS. 8 and 9 includes similar indentations 115.

The foregoing description teaches a specific presently preferred method for "forming" the bolt and center-pilot mounting openings and several embodiments of apparatus for performing such method. Specifically, the bolt openings are pierced and coined, and the ID of the center-pilot opening is shear-formed. However, the term "forming" encompasses other, albeit less preferred, methods such as drilling, milling or boring where appropriate.

The invention claimed is:

1. Apparatus for forming bolt and center pilot openings in a preformed vehicle wheel which includes a rim having a tire bead seat region and a wheel mounting disc having a preformed center opening carried internally of said rim, said apparatus comprising
    a fixed support,
    a column mounted on said fixed support and defining a column axis,
    a first die assembly mounted on said support surrounding said column for reciprocation along said axis with respect to said column and support, said first die assembly including support means for axially supporting one face of a wheel disc surrounding said preformed center opening while leaving said wheel free to move radially of said axis,
    a circumferential series of locating means carried in a planar array by said first die assembly for radial reciprocation with respect to said column axis, a second die assembly opposed to said first die assembly, and including means for engaging a face of said disc opposed to said one face and means for forming said bolt openings in said disc on a bolt opening axis coincident with said column axis, means depending from said second die assembly for engaging and reciprocating said locating means radially inwardly toward said axis to engage and hold the bead seat region of a wheel in said apparatus, said locating means including means for radial positioning each of said locating means so as to engage said bead seat region without plastic deformation to said bead seat region, said support means being constructed for engaging said one disc face while permitting lateral motion of said wheel upon engagement by said locating means to locate said bead seat region on a bead seat axis at preselected position with respect to said column axis without plastic deformation of said rim or said disc, lateral positioning of said bead seat axis with respect to said column axis being determined solely by said locating means, means carried in fixed position on said center column and having a predetermined diameter greater than the diameter of said preformed center opening for shear-swaging enlargement of said preformed center opening on a center-opening axis at preselected position with respect to said column axis, and means for propelling said second die assembly in the direction of said column axis in a continuous motion for first engaging and reciprocating said locating means into engagement with the bead seat of a wheel to position the bead seat axis, for thereafter forming said bolt openings, and for thereafter moving said wheel and said first die assembly conjointly with each other along said column to bring said preformed center opening into shearing engagement with said shear-swaging means, said shear-swaging means being sized to form said center opening by shear-removal of material from said disc around said preformed opening, said column, said first and second die assemblies and said locating means being constructed for lost motion of said second die assembly with respect to said column, said first die assembly and said locating means between engagement of said locating means and forming said openings, and between forming said bolt openings and shear-swaging said center opening.

2. The apparatus set forth in claim 1 wherein said first die assembly includes a die base having a plurality of punches affixed thereto and projecting axially therefrom in a circular array about said column axis to pierce said bolt openings, a die head mounted for axial movement on said die base, means biasing said die head with respect to said base in the direction of said planar array, and stop means for limiting motion of said head against said biasing means, said stop means being so positioned with respect to said punches and said base that said bolt openings are pierced and formed by said punches prior to engagement of said stop means.

3. The apparatus set forth in claim 1 wherein said preformed disc center opening is circumferentially surrounded by an axially extending flange having an array of angularly spaced indentations projecting radially inwardly therefrom, said indentations defining circumference of said center opening, and wherein said means for shear-swaging said center opening includes means for shear-removal of material from said indentations without plastic deformation of said flange or said disc.

4. Apparatus for forming bolt and center-pilot openings in a preformed vehicle disc wheel which includes a wheel rim having a radially outwardly facing tire bead seat region and a wheel disc having a preformed center opening surrounded by an axially extending flange mounted internally of said rim, said apparatus comprising a circumferential array of locating means disposed in a planar array for selectively radially engaging and holding said bead seat region centered on a first axis without plastic deformation to said bead seat region, a first die assembly mounted on one side of said planar array for reciprocation in the direction of said first axis, said first die assembly including a die base having circumferential series of bolt opening punches fixedly projecting in the axial direction toward said array about a second axis and a die head surrounding said punches for abutting engagement with an opposing surface of the wheel disc, and means for axially engaging said locating means and moving said locating means into engagement with said bead seat region, a second die assembly mounted on the opposing side of said planar array for engaging and holding said disc against deflection from said first die assembly, disc-engaging portions of said first and second die assemblies including means for permitting lateral motion of said preformed wheel when engaged by said locating means, a column fixedly positioned at one end and extending through said second die assembly to a second end, with a center-pilot opening punch being mounted on said second end for shear-punching said disc center opening on a third axis, means mounting said locating means on said second die assembly for conjoint motion axially of and guided by said column, and means for propelling said first die assembly in said direction of said first axis in a continuous uninterrupted motion toward said array so that said locating means are closed against the bead seat region of a wheel on said second die assembly, said bolt openings are formed on said second axis in the disc of a wheel engaged and held on said first axis by said locating means, followed by conjoint motion of said first and second die assemblies and said disc against said center punch for shearing said flange inside diameter on said third axis to form said center pilot opening.

5. The apparatus set forth in claim 4 wherein said locating means include means for selectively positioning said first axis with respect to said second axis, and wherein said center punch includes means for selectively positioning said third axis with respect to said second axis.

6. The apparatus set forth in claim 4 wherein said die head is mounted for axial movement on said die base and wherein said first die means further comprises means normally biasing said die head toward said planar array, said die head and biasing means being such that said die head engages the disc of a wheel held by said locating means prior to engagement of said bolt opening punches with said disc, and stop means for limiting motion of said die head against said biasing means, so that further motion of said die base is transmitted to said second die means and said locator means through said stop means, die head and wheel disc.

7. The apparatus set forth in claim 6 wherein said preformed disc center opening is circumferentially surrounding by an axially extending flange having an array of angularly spaced indentations projecting radially inwardly therefrom, said indentations defining circumference of said center opening, and wherein said center-pilot opening punch includes means for shear-removal of material from said indentations without plastic deformation of said flange or said disc.

* * * * *